United States Patent
Tione et al.

(10) Patent No.: US 12,503,090 B2
(45) Date of Patent: Dec. 23, 2025

(54) ANTI-SKID SYSTEM FOR AN ELECTROMECHANICAL BRAKING SYSTEM

(71) Applicant: FAIVELEY TRANSPORT ITALIA S.P.A., Turin (IT)

(72) Inventors: Roberto Tione, Turin (IT); Matteo Frea, Turin (IT); Angelo Grasso, Asti (IT); Paolo Pietro Piccione, Turin (IT)

(73) Assignee: Faiveley Transport Italia S.P.A., Turin (IT)

( * ) Notice: Subject to any disclaimer, the term of this patent is extended or adjusted under 35 U.S.C. 154(b) by 112 days.

(21) Appl. No.: 18/548,029

(22) PCT Filed: Mar. 2, 2022

(86) PCT No.: PCT/IB2022/051826
§ 371 (c)(1),
(2) Date: Aug. 25, 2023

(87) PCT Pub. No.: WO2022/185226
PCT Pub. Date: Sep. 9, 2022

(65) Prior Publication Data
US 2024/0132031 A1    Apr. 25, 2024
US 2024/0227756 A9    Jul. 11, 2024

(30) Foreign Application Priority Data
Mar. 2, 2021  (IT) .................. 102021000004784

(51) Int. Cl.
B60T 8/17    (2006.01)
B60T 8/171   (2006.01)
(Continued)

(52) U.S. Cl.
CPC ........ B60T 8/17616 (2013.01); B60T 8/1705 (2013.01); B60T 8/171 (2013.01); B60T 8/172 (2013.01)

(58) Field of Classification Search
CPC .............................. B60T 8/1705; B60T 17/228
See application file for complete search history.

(56) References Cited

U.S. PATENT DOCUMENTS 9,892,217 B2 *  2/2018  Kang .................... B60T 13/665
10,668,906 B2 *  6/2020  Ueno ....................... B60T 8/171
(Continued)

FOREIGN PATENT DOCUMENTS

CN        111959467 A    11/2020
DE    102011006002 A1     9/2012
(Continued)

OTHER PUBLICATIONS

ISA European Patent Office, International Search Report Issued in Application No. PCT/IB2022/051826, Jun. 20, 2022, WIPO, 3 pages.

*Primary Examiner* — Long T Tran
(74) *Attorney, Agent, or Firm* — K&L Gates LLP

(57) ABSTRACT

An anti-skid system for an electromechanical braking system of at least one vehicle including at least one wheel is described, comprising an anti-skid module arranged to execute a predetermined anti-skid function and a supervisor module arranged to monitor the anti-skid module, wherein the supervisor module includes a braking force application request adjustment module, wherein the supervisor module and the anti-skid module are modules that are distinct from each other, and the braking force application request adjustment module is arranged to adjust a braking force application request signal independently of the execution of the anti-skid function by the anti-skid module.

9 Claims, 6 Drawing Sheets

(51) Int. Cl.
 *B60T 8/172* (2006.01)
 *B60T 8/1761* (2006.01)

(56) References Cited

U.S. PATENT DOCUMENTS

| | | | |
|---|---|---|---|
| 11,654,872 B2* | 5/2023 | Nilsson | B60T 7/042 |
| | | | 303/20 |
| 2014/0046514 A1* | 2/2014 | Jennek | B60T 17/228 |
| | | | 701/20 |
| 2014/0190512 A1* | 7/2014 | Elstorpff | B61H 7/00 |
| | | | 134/1 |
| 2014/0222258 A1* | 8/2014 | Elstorpff | B60T 17/228 |
| | | | 701/19 |
| 2016/0257323 A1* | 9/2016 | Meyer | B61L 27/12 |
| 2017/0197606 A1* | 7/2017 | Kipp | B60T 8/885 |
| 2018/0281759 A1* | 10/2018 | Rasel | B60T 8/17616 |
| 2019/0359189 A1* | 11/2019 | Rasel | B60T 8/1705 |
| 2022/0176936 A1* | 6/2022 | Tione | B60T 8/1705 |

FOREIGN PATENT DOCUMENTS

| | | |
|---|---|---|
| EP | 3393873 B1 | 11/2019 |
| WO | 2015043954 A1 | 4/2015 |
| WO | 2017175108 A1 | 10/2017 |
| WO | 2019047049 A1 | 3/2019 |

\* cited by examiner

ANTI-SKID SYSTEM FOR AN ELECTROMECHANICAL BRAKING SYSTEM

CROSS REFERENCE TO RELATED APPLICATIONS

The present application is a U.S. National Phase of International Application No. PCT/IB2022/051826 entitled "ANTI-SKID SYSTEM FOR AN ELECTROMECHANICAL BRAKING SYSTEM," and filed on Mar. 2, 2022. International Application No. PCT/IB2022/051826 claims priority to Italian Patent Application No. 102021000004784 filed on Mar. 2, 2021. The entire contents of each of the above-listed applications are hereby incorporated by reference for all purposes.

TECHNICAL FIELD

This invention generally lies within the field of braking systems for vehicles. In particular, the invention relates to an anti-skid system for an electromechanical braking system of at least one vehicle, in particular at least one railway vehicle.

PRIOR ART

The prior art will be described below with particular reference to the field of railway vehicles. Nevertheless, that which is described in the following may also apply, where possible, to vehicles in other fields.

In the railway transport system, the instantaneous grip value between the wheel and the track represents the maximum braking force limit that may be applied to the axles without the wheels of said axles starting to progressively skid.

When an axle enters a skidding phase, if the applied braking force is not promptly and suitably reduced, the axle progressively loses angular velocity until it has completely jammed, resulting in immediate overheating and damage caused by the overtemperature of the surface of the wheels of said axle at the point of contact between the wheels and the track. It is known that this situation not only significantly increases the stopping distances as a result of a further reduction in the coefficient of friction, but may also cause the railway vehicle to derail at high operating speeds.

In order to overcome the drawback described above, known pneumatic railway braking systems are provided with a protection system known as an anti-skid system.

A known anti-skid system is shown by way of example in FIG. 1. In one example, this anti-skid system is used for a railway vehicle having four axles 102, 103, 104, 105. On the basis of a request for braking pressure or braking force (not shown in FIG. 1), a braking system 110 produces a pneumatic braking pressure, thus supplying respective brake cylinders 111, 112, 113, 114. These brake cylinders are each responsible for braking the respective axles 102, 103, 104, 105 by means of pneumatic supply ducts 115, 116. Four anti-skid valve modules 117, 118, 119, 120 are controlled by an anti-skid device 101 and are placed between the pneumatic supply ducts 115, 116 and the respective brake cylinders 111, 122 and 113, 114. Angular velocity sensors 106, 107, 108, 109 detect the angular velocity of each of the axles 102, 103, 104, 105, respectively. Said angular velocity sensors 106, 107, 108, 109 are electrically connected to the anti-skid device 101, continuously providing an electrical signal that represents the instantaneous angular velocity information of each axle 102, 103, 104, 105. The anti-skid device 101 continuously estimates the instantaneous linear velocity of the vehicle by means of operations carried out on the instantaneous angular velocity information of the axles 102, 103, 104, 105.

By continuously evaluating differences $\Delta V$ between the instantaneous linear velocity of the single axle, which instantaneous linear velocity is obtained from said instantaneous angular velocity of the axle, and the estimated instantaneous linear velocity of the vehicle, the anti-skid device 101 detects if one or more axles have started to skid. If one or more axles have started a skidding phase, the anti-skid device controls the skidding of said axles by reducing and suitably modulating the pressure at the brake cylinders relative to the skidding axles, acting on the valve groups relating to said skidding axles by means of known algorithms, for example as described in EP3393873 and WO2017175108, preventing said axles from becoming jammed, and attempting to obtain the best braking force while remaining in a sliding phase.

Said anti-skid valve modules 117, 118, 119, 120 each assume the detailed form represented by the pair of pneumatic solenoid valves 220, 221 shown in FIG. 2.

The pneumatic solenoid valves 220, 221 are energized by the anti-skid device 201 by means of respective switching elements 202, 203. These switching elements 202, 203 are typically solid-state electronic components.

For simplicity of illustration, FIG. 2 does not show the connection of solenoids, i.e. electrical coils, 204, 205 to earth.

The anti-skid valve modules 117, 118, 119, 120 may assume a total of four states.

The first state is defined as a "filling state" and corresponds to a state in which both of the electropneumatic valves are de-energized, as shown in FIG. 2: the electropneumatic valve 220 allows the pressure present in a pneumatic duct 215, corresponding to the pneumatic duct 115, 116 in FIG. 1, to access a brake cylinder 211, corresponding to the brake cylinder 111, 112, 113, 114 of FIG. 1, while the electropneumatic valve 221 prevents the brake cylinder 211 and the pneumatic duct 215 from emptying into the atmosphere. This state represents the rest state, or state of non-intervention, of the anti-skid device, in that it constitutes a direct connection between the brake cylinder 211 and the pneumatic duct 215, via which connection the braking system directly controls the pressure at the brake cylinder 211 from a zero value to a maximum value.

The second state is defined as a "hold state" and corresponds to a state in which the electropneumatic valve 220 is energized. In this case, the pressure in the brake cylinder 211 may not be modified by variations in pressure in the pneumatic duct 215. The pneumatic solenoid valve 221 continues to keep the brake cylinder 211 isolated from the atmosphere. The pressure at the brake cylinder 211 generally holds its value indefinitely unless there are leaks in the brake cylinder.

The third state is defined as a "discharge state" and corresponds to a state in which both the pneumatic solenoid valves 220, 221 are energized. In this case, the pressure in the brake cylinder 211 may not be modified by variations in pressure in the pneumatic duct 215. The energized pneumatic solenoid valve 221 connects the brake cylinder 211 to the atmosphere, thus reducing the pressure at the brake cylinder, optionally to a value of zero.

The fourth state is defined as a "prohibited state" and corresponds to a state in which only the pneumatic solenoid valve 221 is energized. In this case, the pneumatic solenoid valve directly connects both the brake cylinder 211 and the pneumatic duct 215 to the atmosphere, causing the pressure produced by the braking system to unduly discharge to the atmosphere.

In order to systematically prevent the "prohibited" state, the switching element 203 is connected to a node 206 downstream of the switching element 202. In this way, when the switching element 203 is closed by an improper command from the circuit upstream or as a result of a short circuit of said circuit, it is not possible to energize the pneumatic solenoid valve 221 unless the switching element 202 is also closed, in which case the pneumatic solenoid valve 220 would also be energized, effectively bringing the brake cylinder 211 into the "discharge" state but preventing the pneumatic duct 215 from discharging to the atmosphere.

The prior art discloses various circuits for controlling the pneumatic solenoid valves, either in relation to the supply or in relation to the ground, which allow the "prohibited" state to be systematically prevented.

In its functional action, the anti-skid system generally inevitably reduces the braking force. It is clear how, in certain hardware or software failure modes, the anti-skid device is able to keep the pneumatic solenoid valves 220, 221 permanently energized, resulting in a total loss of braking force. In order to limit cases of permanently energized valves, the European railway standard EN15595:2018 "Railway applications—Braking—Wheel slide protection" § 5.1.4, 12 Dec. 2018, states:

> For safety reasons, a monitoring function is provided to avoid an excessive reduction of braking effort. This watchdog function of the wheel slide protection (WSP) device shall be provided for WSP systems capable of acting during emergency braking, and shall be independent from the WSP control algorithm and processor. A continual brake effort release demanded by the WSP shall not exceed 10 s. After this time, the watchdog will inhibit WSP intervention. The WSP watchdog shall inhibit WSP intervention in the case where the brake effort is maintained constant or continuously reduced below the demanded level with no rise in brake effort for a period which shall not exceed 15 s.

In other words, the standard dictates three important points:
- a continuous and constant reduction in braking force must not exceed 15 seconds;
- a total reduction in braking force must not exceed 10 seconds;
- the timer device or the timer devices used to time and inhibit the anti-skid WSP "wheel slide protection" device must be totally independent from the software component and the microprocessor used to implement the WSP anti-skid device.

These one or more timer devices are introduced in order to temporally limit the continuous activation of the pneumatic solenoid valves 210, 212.

FIG. 2 shows a possible functional embodiment of the control system of an anti-skid system. A control means, e.g. a microprocessor 207, executes functions/algorithms for recognizing and controlling skidding of the axles, for example but not exclusively as described in EP3393873 and WO2017175108, by generating respective command signals 208, 209 for the switching elements 202, 203.

When the control means 207 brings the command signal 208 to a logic level "1", i.e. which is intended to activate the switching element 202, the transition 0→1 of the command signal 208 activates the timer device 210, which in turn brings an output 213 thereof to a logic level "1" for a time interval T1 that is equal, for example but not exclusively, to 10 s. A logic gate 216 executes an AND function between the command signal 208 and the output signal 213, thus causing a signal 214 to effectively command the closure of the switching element 202, in order to subsequently energize the pneumatic solenoid valve 220.

When the microprocessor 207 brings the command signal 208 to a logic level "0", before the time T1 has expired, in order to de-energize the pneumatic solenoid valve 220, it then puts the timer device 210 into a reset condition via an active low input R thereof, preparing it for a subsequent transition 0→1.

If the command signal 208 were to remain permanently blocked at logic level "1" as a result of a hardware failure of the microprocessor 207 or as a result of a software error of the anti-skid control algorithm, the time T1 counted by the timer device 210 would then expire, causing the signals 213, 214 to return to a logic level "0", resulting in the permanent de-energizing of the pneumatic solenoid valve 220.

The same applies to the timer device 212 in relation to the electropneumatic valve 221.

In some cases, there is a pressure transducer 222 present that indicates to the control means 207, via a connection 224, the pressure upstream of the pneumatic solenoid valve 220, and there is a pressure transducer 223 present that indicates to the control means 207, via a connection 225, the pressure at the brake cylinder 211.

The prior art discloses circuit variants for implementing the function of timing and inhibiting the commands for energizing the electropneumatic valves 220, 221.

The timing circuits shown in FIG. 2 are replicated for each anti-skid valve group 111, 112, 113, 114.

In each case, according to the prior art, the timer devices 210, 212 are hardware circuits independent from the control means 207, in accordance with the cited standard.

The solution described above represents the prior art identified by all railway operators and railway safety agencies as a method for reducing the risk that hardware failures or software problems may cause a permanent undue reduction in pneumatic pressure during a braking phase.

Disadvantageously, it is not possible to apply the solutions described above to electromechanical braking systems on account of the significant structural differences by comparison with pneumatic braking systems.

SUMMARY OF THE INVENTION

The object of this invention is therefore to provide a solution that allows an anti-skid function to be executed safely in an electromechanical braking system of at least one vehicle, for example at least one railway vehicle.

The aforesaid and other objects and advantages are achieved, according to an aspect of the invention, by an anti-skid system for an electromechanical braking system having the features defined in claim 1. Preferred embodiments of the invention are defined in the dependent claims, the content of which is to be understood as an integral part of the present description.

BRIEF DESCRIPTION OF THE DRAWINGS

The functional and structural features of some preferred embodiments of an anti-skid system for an electromechanical braking system according to the invention will now be described. Reference is made to the accompanying drawings, in which.

DETAILED DESCRIPTION

Figure 1:
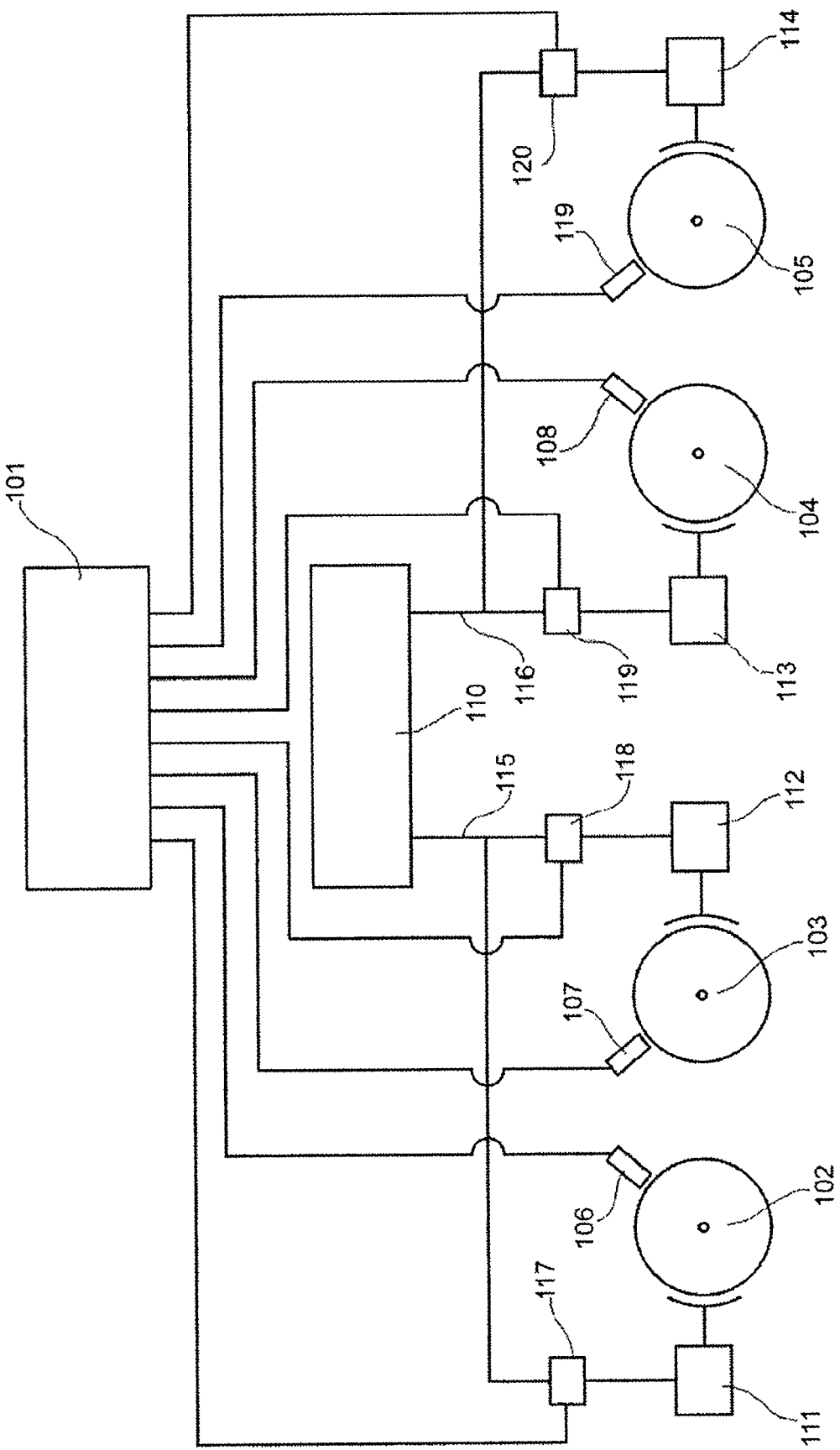
FIG. 1 shows a known example of an anti-skid system.

Before describing a plurality of embodiments of the invention in detail, it should be clarified that the invention is not limited in its application to the construction details and configuration of the components presented in the following description or illustrated in the drawings. The invention is able to assume other embodiments and to be implemented or constructed in practice in different ways. It should also be understood that the phraseology and terminology have a descriptive purpose and should not be construed as limiting. The use of "include" and "comprise" and the variations thereof are intended to cover the elements set out below and their equivalents, as well as additional elements and the equivalents thereof.

New technologies, including mechatronic technologies, are being introduced to the field of braking systems, for example railway braking systems.

Figure 3:
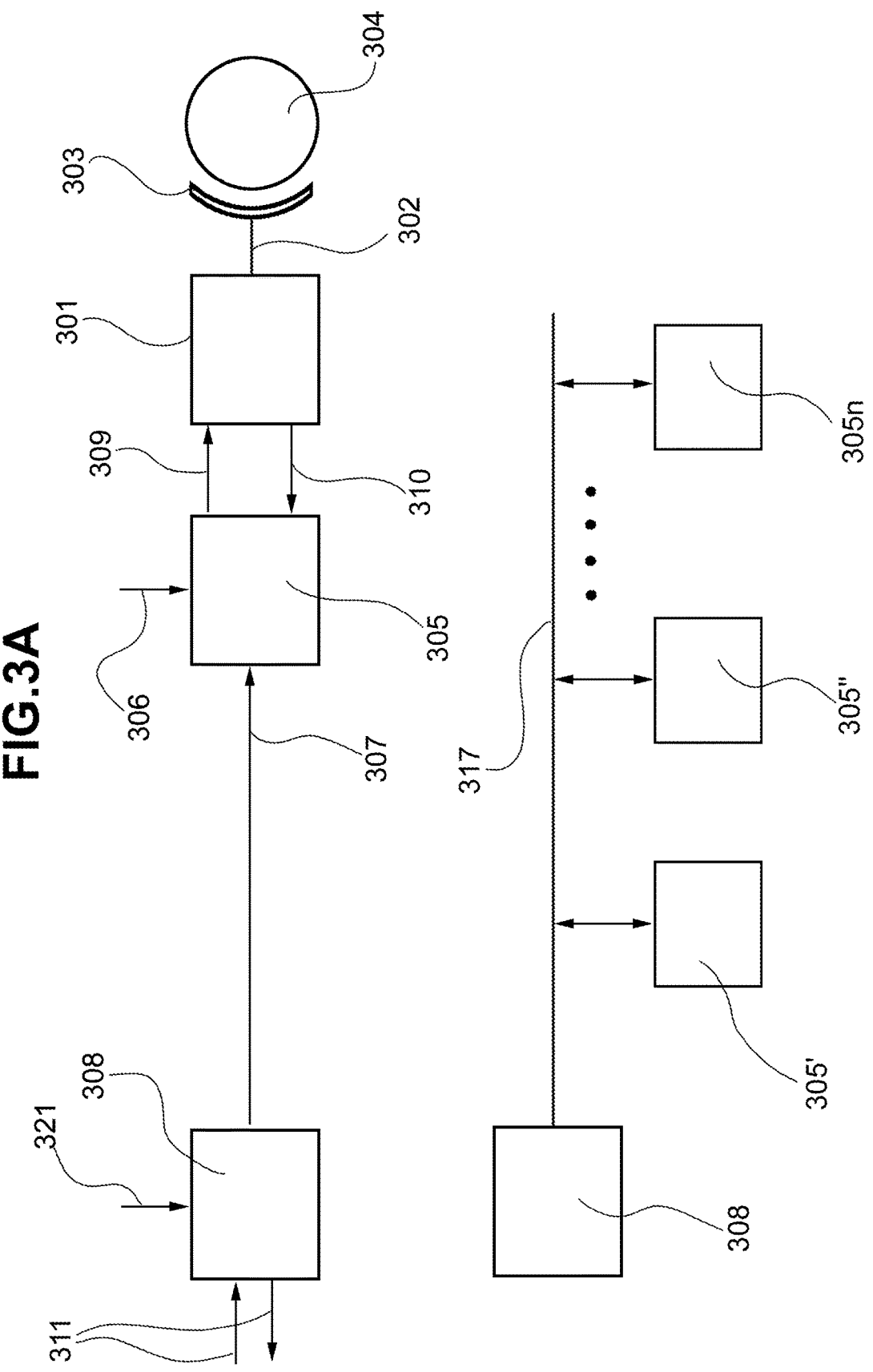
FIGS. 3A and 3B are example block diagrams of electromechanical braking systems.

For the sake of completeness of information, the following will provide a description of various modules/blocks that may be part of an electromechanical braking system. For example, FIGS. 3A and 3B show possible non-exclusive block diagrams of electromechanical braking systems.

A braking control module 308 may be provided in order to be interfaced with control systems of the vehicle or convoy, for example railway vehicle or convoy, by means of signals 311 via which it may receive the service braking requests and/or receive an emergency braking request 321.

This braking control module 308 may convert the service braking or emergency braking requests that come from the vehicle or convoy (for example railway vehicle or convoy) into a braking force application request 307. It is not the aim of this invention to illustrate how the braking control module 308 is implemented, whether this is with one or more independent control means, and what safety level SIL has to be assigned to the individual elements that form said braking control module 308.

According to the prior art, an electromechanical module 301 may comprise at least one electric motor and mechanical components adapted to transform the rotary motion and the torque produced by said at least one electric motor into a linear movement and a linear force, respectively, which are transferred to an arm 302 or brake shoe 303, in order to generate a braking force on the wheel 304.

It is known from the prior art that the arm 302 and the brake shoe 303 may have, as an alternative means of braking, a system of brake levers and pads that act on a brake disc.

An electronic module 305 for controlling the braking force may be arranged to receive an electrical supply 306 and the braking force application request 307 generated by the braking control module 308, and is arranged to generate at least one supply signal 309 for the at least one electric motor inside the electromechanical module 301 and to receive at least one applied braking force signal 310 generated by said electromechanical module 301, said applied braking force signal 310 assuming an instantaneous value corresponding to the instantaneous value of the braking force applied by said electromechanical module 301 to the wheel 304.

The electronic force control module 305 may execute control algorithms by suitably modulating the at least one supply signal 309 such that said electromechanical module 301 continuously produces an applied braking force signal 310 corresponding to the braking force application request value 307.

If the electronic force control module 305 and the braking control module 308 are separate physical units, the braking force application request 307 may physically consist of a point-to-point network connection as shown in FIG. 3A, or, as shown in FIG. 3B, of a communication network 317 to which more electronic force control modules $305^I$, $305^{II}$, . . . , $305^n$ are connected, with which modules the respective electromechanical modules 301 for braking the respective wheels 304 are associated. The electromechanical modules 301 and the wheels 304 are not shown in FIG. 3B.

Unlike pneumatic braking systems where the anti-skid device acts directly on the flow of the means that transfers the braking force, i.e. on the flow of pressurized air toward the brake cylinder, the systems described in FIGS. 3A and 3B are not suitable for the incorporation of an anti-skid system that acts directly on the means for transmitting the braking force. Conversely, this invention proposes solutions that act on the logic flow of the braking force application request.

Returning now to this invention, it relates to an anti-skid system for an electromechanical braking system of at least one vehicle.

For example, said at least one vehicle may be at least one railway vehicle.

This vehicle includes at least one wheel.

In one embodiment, the anti-skid system comprises an anti-skid module 402 arranged to execute a predetermined anti-skid function and to provide an output, the value of which is determined by said predetermined anti-skid function.

For the purposes of this invention, the anti-skid function 402 may be any anti-skid function currently known in the field.

The anti-skid system also comprises a supervisor module 421, 521 which is arranged to monitor said anti-skid module 402. The supervisor module 421, 521 is also arranged to receive the output of the anti-skid module 402 and a braking force application request signal 307, the value of which is indicative of a braking force application request value.

The supervisor module 421, 521 includes a braking force application request adjustment module 403, 503 which is arranged to adjust the value of said braking force application request signal 307 according to said output of the anti-skid module 402.

The supervisor module 421, 521 and the anti-skid module 402 are modules that are distinct from each other.

The supervisor module 421, 521 may clearly be a hardware module or a software module, and the module 402 for executing the anti-skid function may be a hardware module or a software module. Distinct may be understood to mean, inter alia, at least all of the following cases:

the supervisor module 421, 521 is a hardware module and the module 402 for executing the anti-skid function is a hardware module, and the supervisor module 421, 521 does not have hardware components in common with the module for executing the anti-skid function;

the supervisor module 421, 521 is a hardware module and the module 402 for executing the anti-skid function is a software module, and the module for executing the anti-skid function is not executed by the hardware components of the supervisor module 421, 521;

the supervisor module 421, 521 is a software module and the module 402 for executing the anti-skid function is a hardware module, and the supervisor module 421, 521 is not executed by the hardware components of the module for executing the anti-skid function;

the supervisor module 421, 521 is a software module and the module 402 for executing the anti-skid function is a software module, and the software modules do not have instructions in common and are not executed on common hardware components.

The braking force application request adjustment module 403, 503 is therefore arranged to adjust the braking force application request signal 307 independently of the execution of the anti-skid function 402 by the anti-skid module 402.

Figure 4:
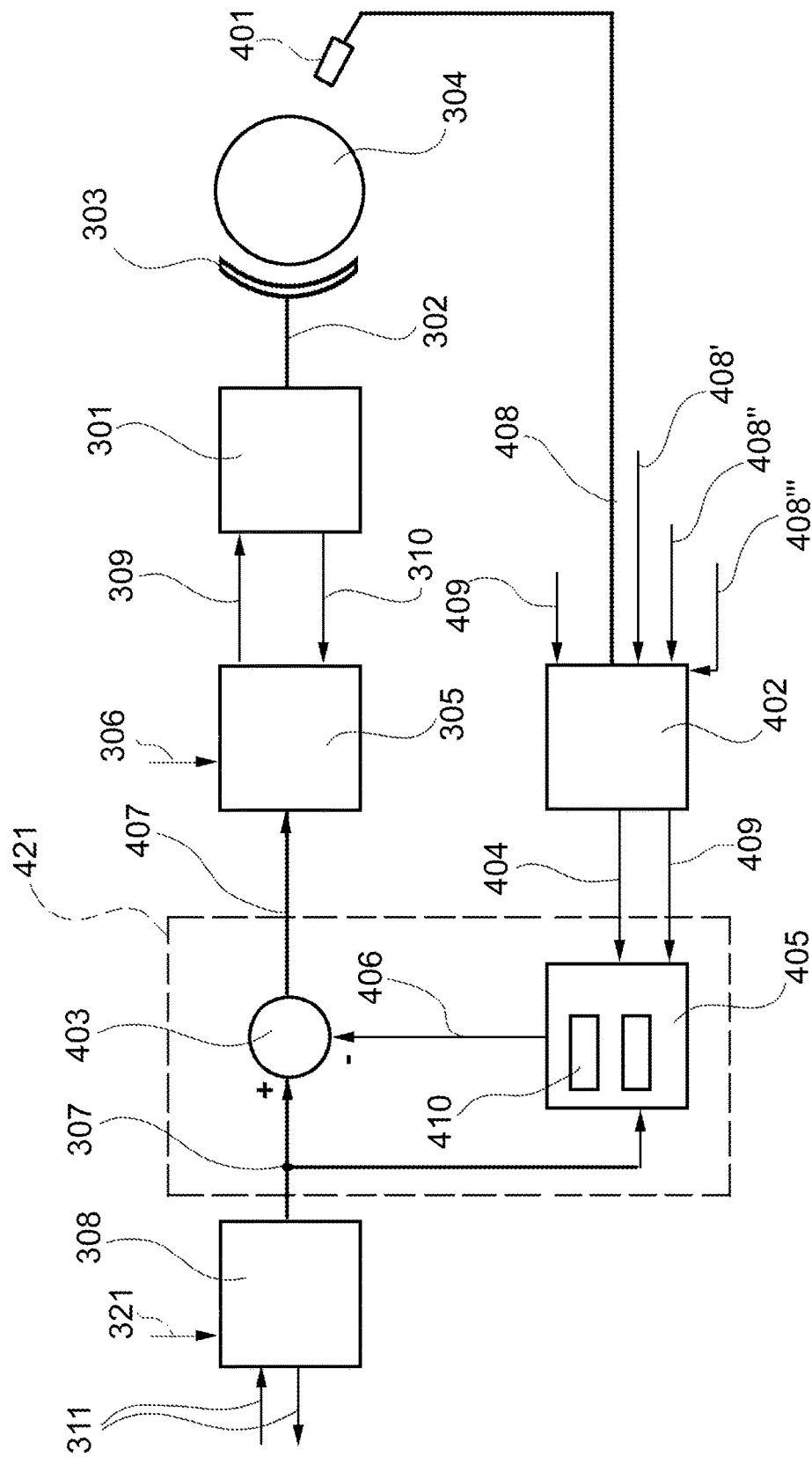
FIG. 4 shows an example architecture of an electromechanical braking system including an anti-skid system according to an embodiment of this invention.

With reference to FIG. 4, in one embodiment, the anti-skid module 402 may be arranged to generate, at said output thereof, a braking force reduction signal 404. The value of this braking force reduction signal is indicative of a braking force reduction value. The anti-skid module 402 may be arranged to adjust the value of the braking force reduction signal 404 such that the braking force reduction value is non-zero, in the presence of at least one skidding condition of at least one wheel 304 of the at least one vehicle, in accordance with said predetermined anti-skid function.

For example, an anti-skid module 402 may be arranged to receive an instantaneous velocity signal 409 of the vehicle, at least one instantaneous velocity signal 408 of the wheel 304, which signal is generated by the velocity sensor 401 associated with said wheel 304, and optionally further velocity signals $408^1 \ldots 408^n$ from other velocity sensors associated with further wheels. The anti-skid module may be arranged to execute anti-skid algorithms, not exclusively as described in EP3393873 and WO2017175108, and to calculate a braking force reduction value 404 if the wheel 304 is skidding.

The supervisor module 421 may be arranged to receive the braking force application request signal 307 and the braking force reduction signal 404 generated by the anti-skid module 402. The supervisor module 421 may also be arranged to generate an adjusted braking force signal 407 indicative of an adjusted braking force value.

The supervisor module 421 may also include a time-out module 405 which is arranged to receive the braking force application request signal 307 and the braking force reduction signal 404 generated by the anti-skid module 402. The supervisor module 421 may also be arranged to generate a timed braking force reduction signal 406. The value of this timed braking force reduction signal 406 is indicative of a timed braking force reduction value.

The time-out module 405 may be arranged to adjust the value of the timed braking force reduction signal 406 such that the timed braking force reduction value:

corresponds to the braking force reduction value indicated by said braking force reduction signal 404 generated by the anti-skid module 402, when, for a time shorter than a first time interval, the braking force reduction value indicated by the braking force reduction signal 404 is continuously non-zero but lower than the braking force application request value indicated by said braking force application request signal 307, or when, for a time shorter than a second time interval that is shorter than said first time interval, the braking force reduction value indicated by the braking force reduction signal 404 is continuously higher than or equal to the braking force application request value indicated by said braking force application request signal 307;

is zero, when, for a time longer than said first time interval, the braking force reduction value indicated by the braking force reduction signal 404 is continuously non-zero but lower than the braking force application request value indicated by said braking force application request signal 307, or when, for a time longer than or equal to said second time interval, the braking force reduction value indicated by the braking force reduction signal 404 is continuously higher than or equal to the braking force application request value indicated by said braking force application request signal 307.

The supervisor module 421 may include a braking force application request adjustment module 403 which is arranged to adjust the value of said adjusted braking force signal 407 such that the adjusted braking force value coincides with the value of the difference between the braking force application request value indicated by the braking force application request signal 307 and the timed braking force reduction value indicated by the timed braking force reduction signal 406.

For example, the supervisor module 421 may include a summing node 403 which is arranged to subtract the value of the electrical timed braking force reduction signal 406 from the value of the electrical braking force application request signal 307. The summing node 403 may propagate the result of the subtraction in the form of an adjusted braking force value 407 to a possible electronic force control module 305 of an electromechanical braking system.

Preferably, the first time interval may be monitored by a first timer means 410 and the second time interval may be monitored by a second timer means 411.

For example, the time-out module 405 may:

use the first timer means 410, which may be called, for example, a "partial force reduction timer", to count the period of time in which the braking force reduction request value 404 continuously assumes a non-zero value less than the braking force application request value 307;

use the second timer means 411, which may be called, for example, a "total force reduction timer", to count the period of time in which the braking force reduction request value 404 continuously assumes a value greater than or equal to the braking force application request value 307.

In other words, the time-out module 405 may therefore set the timed braking force reduction value to be equal to the braking force reduction valve 404 until the first timer means 410, i.e. the partial braking force reduction timer 410, has reached a predefined maximum partial braking force reduction time, i.e. the first time interval.

When the first timer means 410, i.e. the partial braking force reduction timer, has reached the predefined maximum partial braking force reduction time, i.e. the first time interval, the time-out module 405 may set and maintain the braking force reduction value equal to zero. The value may be held at zero for example until the velocity value 409 of the vehicle assumes a non-zero value.

In order to respect the values cited in the standard EN15595:2018 § 5.1.4, the first time interval may assume the value of 15 seconds and the second time interval may assume the value of 10 seconds 10 S.

Figure 5:
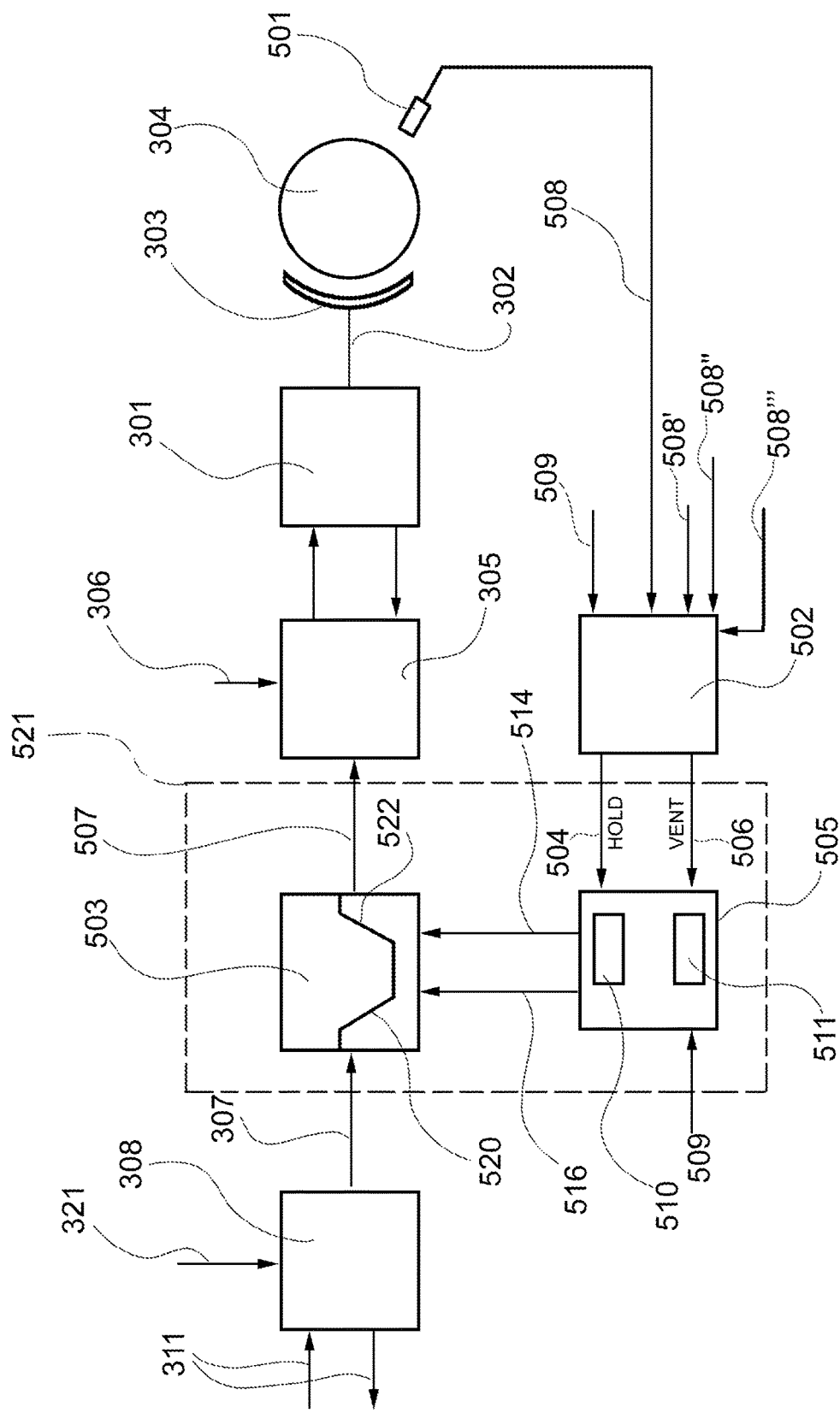
FIG. 5 shows a further example architecture of an electromechanical braking system including an anti-skid system according to a further embodiment of this invention.

With reference to FIG. 5, an alternative embodiment is shown in which the anti-skid module 402 is arranged to generate, at said output thereof, a braking force hold signal 504 and a braking force reduction signal 506, in the presence of at least one skidding condition of at least one wheel 304 of said at least one vehicle, in accordance with said predetermined anti-skid function.

For example, the anti-skid module 502 may be arranged to receive the instantaneous velocity signal 509 of the vehicle, at least one instantaneous velocity signal 508 of the wheel 304, which signal is generated by the velocity sensor 501 associated with said wheel 304, and optionally further velocity signals $508'$ ... $508^n$ from other velocity sensors associated with other wheels.

Figure 2:
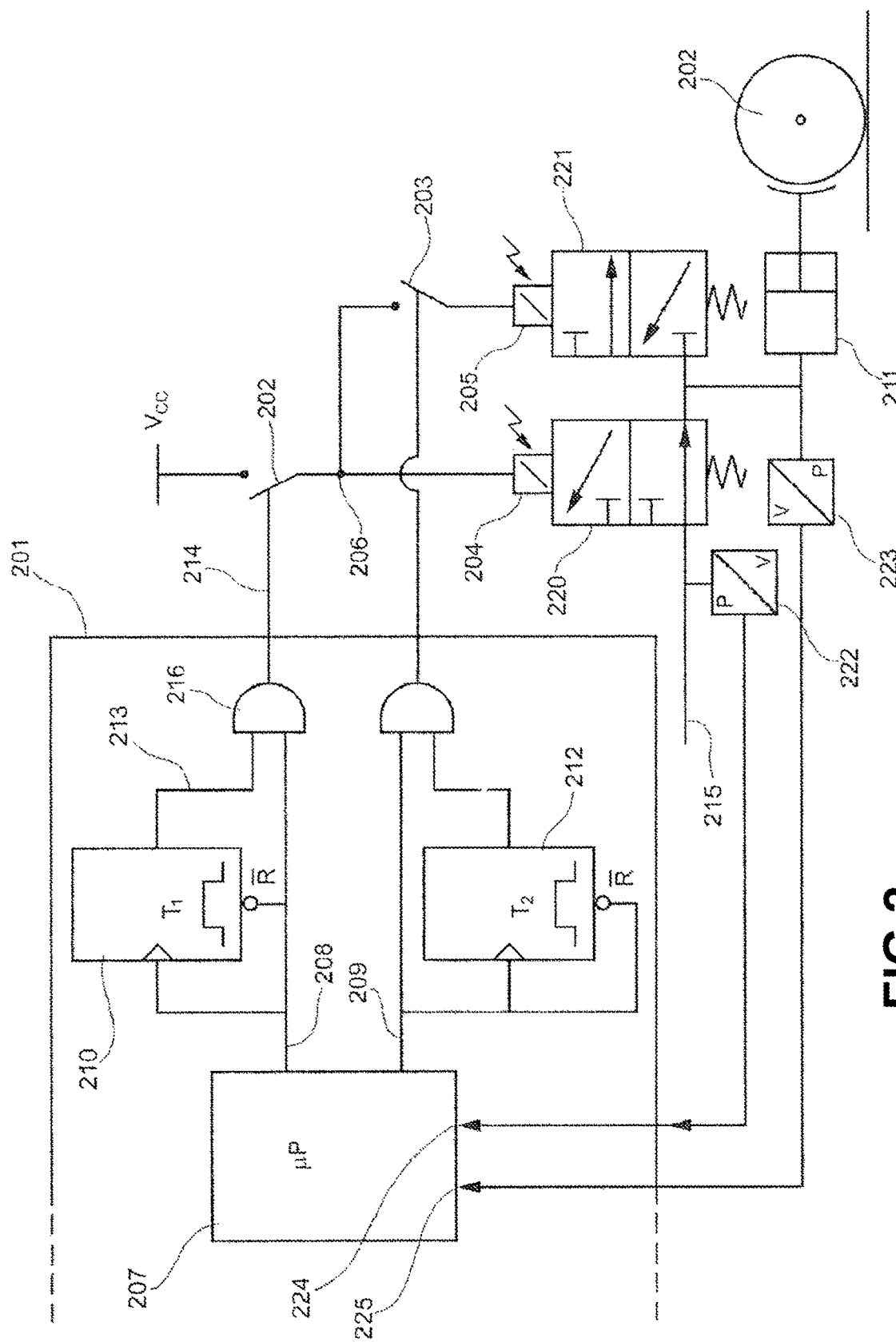
FIG. 2 shows an example embodiment of a known control system for an anti-skid system.

The anti-skid module may be arranged to execute, for example, anti-skid algorithms which are not exclusively as described in EP3393873 and WO2017175108. Similarly to pneumatic anti-skid systems as shown in FIG. 2, the supervisor module 521 may generate the braking force hold signal 504, which is analogous to the signal 208 in FIG. 2, and the braking force reduction signal 506, which is analogous to the signal 209 in FIG. 2.

The supervisor module 521 may be arranged to receive the braking force application request signal 307, the braking force hold signal 504 and the braking force reduction signal 506, and to generate the adjusted braking force signal 507 indicative of the adjusted braking force value. Similarly to pneumatic anti-skid systems as shown in FIG. 2, the supervisor module 521 may generate a braking force hold signal 504, which is analogous to the signal 208 in FIG. 2, and a braking force reduction signal 506, which is analogous to the signal 209 in FIG. 2.

The supervisor module 521 may also include a time-out module 505 which is arranged to receive the braking force hold signal 504 and the braking force reduction signal 506 and to generate a timed braking force hold signal 514 and a timed braking force reduction signal 516.

The time-out module 505 may be arranged to;
cause the timed braking force hold signal 514 to assume a value corresponding to the value of the braking force hold signal 504, when the braking force hold signal 504 continuously assumes a first predetermined value for a time shorter than the first time interval;
cause the timed braking force hold signal 514 to assume a first predetermined default value, when the braking force hold signal 504 continuously assumes the first predetermined value for a time longer than the first time interval;
cause the timed braking force reduction signal 516 to assume a value corresponding to the value of the braking force reduction signal 506, when the braking force reduction signal 506 continuously assumes a second predetermined value for a time shorter than the second time interval that is shorter than said first time interval;
cause the timed braking force reduction signal 516 to assume a second predetermined default value, when the braking force reduction signal 506 continuously assumes the first predetermined value for a time longer than or equal to the second time interval.

For example, the first predetermined value and the second predetermined value may both be a logic condition 1, and the first predetermined default value and the second predetermined default value may both be a logic condition 0. In different embodiments, the first predetermined value and the second predetermined value may be different, and the first predetermined default value and the second predetermined default value may be different.

The supervisor module 521 also includes a braking force application request adjustment module 503 which is arranged to receive the braking force application request signal 307, said timed braking force hold signal 514 and said timed braking force reduction signal 516, and to output an adjusted braking force signal 507.

The braking force application request adjustment module 503 is arranged to:
when the value assumed by said timed braking force hold signal 514 corresponds to the value of the braking force hold signal 504 and the value assumed by the timed braking force reduction signal 516 corresponds to the value of the braking force reduction signal 506, cause the adjusted braking force signal 507 to assume a value which varies over time, such that the adjusted braking force value indicated by the adjusted braking force signal 507 corresponds to the braking force application request value indicated by the braking force application request signal 307 reduced over time according to a predetermined braking force reduction time curve 520, until the adjusted braking force signal 507 assumes a value indicating a zero adjusted braking force value;
when the value assumed by said timed braking force hold signal 514 corresponds to the value of the braking force hold signal 504 and the value assumed by said timed braking force reduction signal 516 corresponds to said second predetermined default value, cause the adjusted braking force signal 507 to maintain over time the value assumed by said adjusted braking force signal 507 at an instant immediately preceding the circumstance that said timed braking force hold signal 514 has the value corresponding to the value of the brake force hold signal 504 and the timed braking force reduction signal 516 has said second predetermined default value;
when the value assumed by said timed braking force hold signal 514 corresponds to said first predetermined default value and the value assumed by said timed braking force reduction signal 516 corresponds to said second predetermined default value, cause the adjusted braking force signal 507 to assume a value which varies over time, such that the adjusted braking force value indicated by the adjusted braking force signal 507 increases over time according to a predetermined braking force increase curve 522, until the adjusted braking force value indicated by the adjusted braking force signal 507 coincides with the braking force application request value indicated by the braking force application request signal 307.

Preferably, for this embodiment as well, the first time interval may be monitored by a first timer means 510 and the second time interval may be monitored by a second timer means 511.

For example, the first timer means 510, which may also be called the "force hold timer", associated with the hold signal 504 may be arranged to count the period of time in which the value of said hold signal 504 continuously assumes the logic value 1, i.e. the first predetermined value, and the second timer means 511, which may also be called the "force reduction timer 511", associated with the braking force reduction signal 506 may be arranged to count the period of time in which the braking force reduction signal 506 continuously assumes the logic value 1, i.e. the first predetermined value.

In this embodiment as well, in order to respect the values cited in the standard EN15595:2018 § 5.1.4, the first time interval may assume the value of 15 seconds and the second time interval may assume the value of 10 seconds 10 S.

According to the prior art, the time-out devices 210, 213 of a pneumatic braking system are developed according to a safety level SIL3, and are typically implemented using hardware devices so as to guarantee the functional independence of the microprocessor 207.

Furthermore, the electropneumatic architecture formed by the switching devices 202, 203 and the electropneumatic valves 220, 221 is considered to have a safety level of SIL≥3, as a result of its design and defined "service proven", i.e. a "level of safety proven by long and reliable service".

Preferably, in order to reach the same safety level for an electromechanical braking system, it is possible to develop the braking force application request adjustment module 403, 503, which may be functionally similar to the switching devices 202, 203 and the electropneumatic valves 220, 221, and the time-out module 405, 505, which may be similar to the time-out devices 210, 212, by means of software functions according to a safety level SIL≥3, which software functions are executed, for example, by microprocessor architecture which is itself developed according to a safety level SIL≥3.

For any of the embodiments described above, the time-out module 405, 505 and the braking force application request adjustment module 403, 503 may preferably be integrated into one module.

For any of the embodiments described above, the braking control module 308 and the anti-skid module 402 may preferably be integrated into one module.

Figure 6:
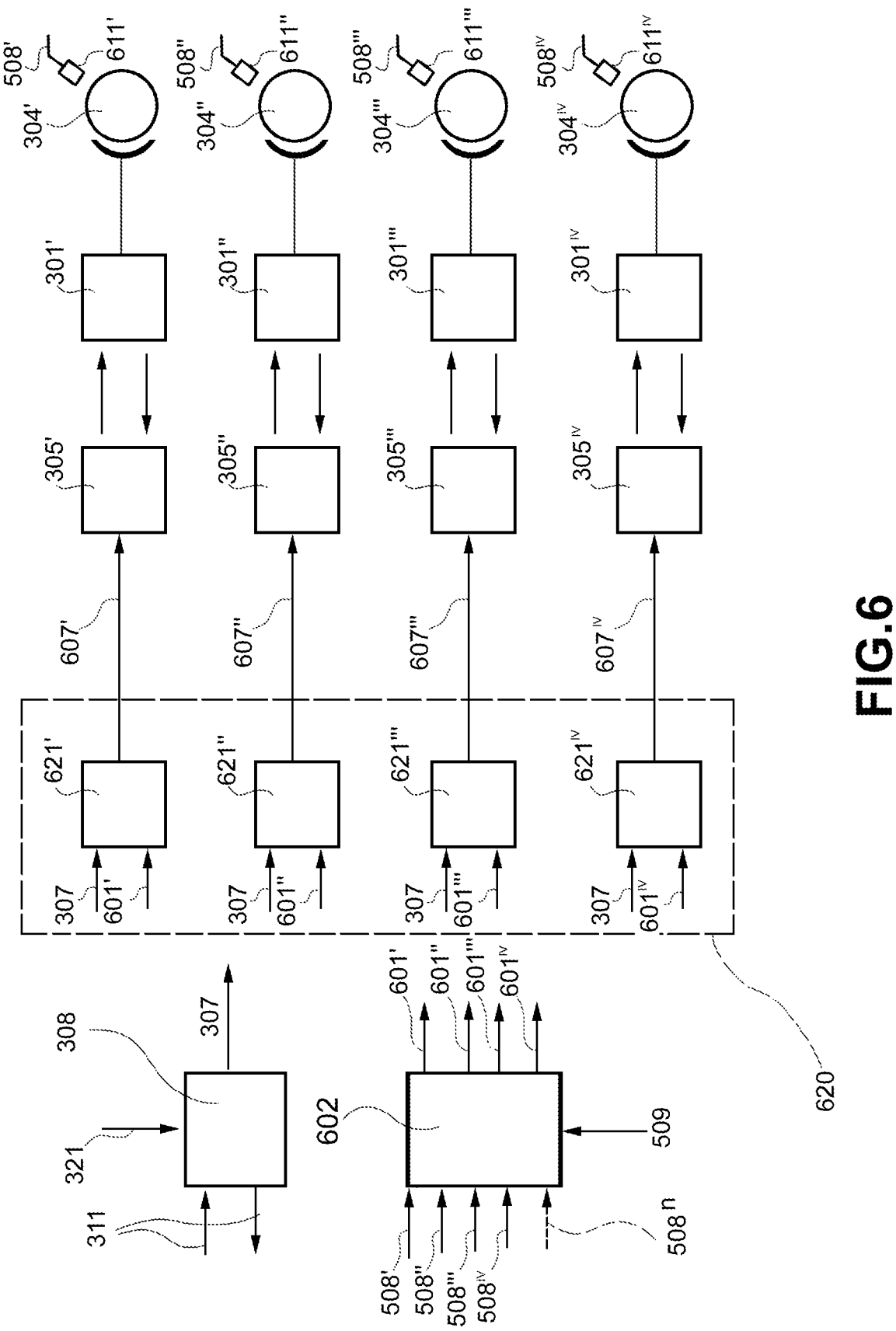
FIG. 6 shows an example electromechanical braking system having at least four axles and including an anti-skid system according to this invention.

With reference to FIG. 6, an embodiment is shown of an electromechanical braking system for a vehicle, for example at least one railway vehicle, which system includes an anti-skid system, analogous to the pneumatic braking system shown in FIG. 1, using the solutions shown in FIGS. 4 and 5 as described above.

Four force control modules $305^I$ $305^{II}$, ... may each control a particular electromechanical module $301^I$, $302^{II}$, ... in order to brake a particular wheel $304^I$, $304^{II}$, .... It is clear to a person skilled in the art of braking control systems, for example railway braking systems, that in reality, for each wheel $304^I$, $304^{II}$, ... shown in FIG. 6, there are two wheels associated with the same axle, and that for each axle, there is a pair of electromechanical modules $301^I$, $301^{II}$, ....

The braking control module 308 may generate a braking force application request 307 which is sent to the supervisor modules $621^I$, $621^{II}$, ... that each correspond to the supervisor module 421 in FIG. 4 or to the supervisor module 521 in FIG. 5. The supervisor modules $621^I$, $621^{II}$, ... may each be associated with the particular braking force control module $305^I$, $305^{II}$, ....

An anti-skid module 602 may be arranged to receive the instantaneous velocity signal 609 of the vehicle and the instantaneous velocity signals $608^I$, $608^{II}$, ... of the respective wheels $304^I$, $304^{II}$, ... that are each generated by the velocity sensors $611^I$, $611^{II}$, ... which are each associated with the respective wheels $304^I$, $304^{II}$, ....

The anti-skid module may be arranged to execute anti-skid algorithms and generate groups of force adjustment signals $601^I$, $601^{II}$, ..., said adjustment signals $601^I$, $601^{II}$, ... being dependent on the slippage of the corresponding wheel $304^I$, $304^{II}$, ..., and said adjustment signals $601^I$, $601^{II}$, ... being sent to the respective supervisor modules $621^I$, $621^{II}$, ....

Each group of adjustment signals 601 functionally corresponds to the timed braking force reduction value 406 in FIG. 4 or to the braking force hold signals 504 and braking force reduction signals 506 in FIG. 5.

The physical implementation of FIG. 6 may have some degree of freedom but it is necessary to respect the requirement for physical independence between the supervisor modules $621^I$, $621^{II}$, ... and the anti-skid module 602.

The anti-skid system may therefore preferably comprise a plurality of supervisor modules $621^I$, $621^{II}$, $621^{III}$, $621^{IV}$. Each of the supervisor modules $621^I$, $621^{II}$, $621^{III}$, $621^{IV}$ may be arranged to generate a relevant adjusted braking force signal $607^I$, $607^{II}$, $607^{III}$, $607^{IV}$. In this case, the plurality of supervisor modules $621^I$, $621^{II}$, $621^{III}$, $621^{IV}$ may be integrated into a single module 620.

In other words, one possible embodiment integrates the supervisor modules $621^I$, $621^{II}$, ... into one module 620 that is independent from the anti-skid module 602. The single module 620 may preferably be implemented at a safety level SIL≥3. The single module 620 may be implemented by means of a system that has one or more control means, e.g. microprocessors, or has one or more programmable logic units, or using a mixed microprocessor and programmable logic units system.

In turn, the single module 620 may be integrated with the braking control module 308, the new integration being kept independent from the anti-skid module 602, and at least the portion responsible for the single module 620 preferably being implemented at a safety level SIL≥3.

In both of the integration cases described, where the force adjustment signals $601^I$, $601^{II}$, ... comprise each of the pair comprising the hold signal 504 corresponding the signal 208 in FIG. 2 and the braking force reduction signal 506 corresponding to the signal 209 in FIG. 2, the anti-skid module 602 may advantageously include an anti-skid device for pneumatic braking systems according to the prior art that corresponds to the anti-skid device 201.

Herein, the value of a signal may clearly be understood to mean, for example, the amplitude thereof or the frequency thereof or any other value of a signal that may be adjusted and measured.

As described above, this invention is particularly applicable to the field of railway vehicles/convoys that travel on railway tracks. For example, a vehicle as referred to herein may be a locomotive or a carriage, and a course/route may include tracks on which the wheels of the locomotive roll. The embodiments described herein are not intended to be limited to vehicles on tracks. For example, the vehicle may be a car, a truck (for example a highway semi-trailer truck, a mining truck, a truck for transporting timber or the like) or the like, and the route may be a road or a trail. For example, a convoy may include a plurality of these vehicles connected or associated with each other.

Various aspects and embodiments of an anti-skid system for an electromechanical braking system according to the invention have been described. It is understood that each embodiment may be combined with any other embodiment. Moreover, the invention is not limited to the embodiments described, but may be varied within the scope defined by the appended claims.

The invention claimed is:

1. An anti-skid system for an electromechanical braking system of at least one vehicle, including at least one wheel, wherein said anti-skid system comprises:

an anti-skid module arranged to execute a predetermined anti-skid function and to provide an output, the value of which is determined by said predetermined anti-skid function;

a supervisor module arranged for monitoring said anti-skid module and to receive the output of said anti-skid module and a braking force application request signal, the value of which is indicative of a braking force application request value;

wherein said supervisor module includes a braking force application request adjustment module arranged to adjust the value of said braking force application request signal according to said output of the anti-skid module;

wherein the supervisor module and the anti-skid module are modules that are distinct from each other, and the braking force application request adjustment module is arranged to adjust said braking force application request signal independently of the execution of the anti-skid function by the anti-skid module.

2. The anti-skid system according to claim 1, wherein:

the anti-skid module is arranged to generate, at said output, a braking force reduction signal, the value of which is indicative of a braking force reduction value, wherein the anti-skid module is arranged to adjust the value of the braking force reduction signal such that the braking force reduction value is non-zero, in the presence of at least one skidding condition of at least one wheel of said at least one vehicle, in accordance with said predetermined anti-skid function;

the supervisor module is arranged to receive the braking force application request signal and the braking force reduction signal generated by the anti-skid module, and to generate an adjusted braking force signal indicative of an adjusted braking force value.

3. The anti-skid system according to claim 2, wherein said supervisor module includes a time-out module arranged to receive the braking force application request signal and the braking force reduction signal generated by the anti-skid module, and to generate a timed braking force reduction signal, the value of which is indicative of a timed braking force reduction value;

wherein the time-out module is arranged to adjust the value of said timed braking force reduction signal such that the timed braking force reduction value:

corresponds to the braking force reduction value indicated by said braking force reduction signal generated by the anti-skid module, when, for a time shorter than a first time interval, the braking force reduction value indicated by the braking force reduction signal is continuously non-zero but lower than the braking force application request value indicated by said braking force application request signal, or when, for a time shorter than a second time interval that is shorter than said first time interval, the braking force reduction value indicated by the braking force reduction signal is continuously higher than or equal to the braking force application request value indicated by said braking force application request signal;

is zero, when for a time longer than said first time interval, the braking force reduction value indicated by the braking force reduction signal is continuously non-zero but lower than the braking force application request value indicated by said braking force application request signal, or when, for a time longer than or equal to said second time interval, the braking force reduction value indicated by the braking force reduction signal is continuously higher than or equal to the braking force application request value indicated by said braking force application request signal;

wherein the braking force application request adjustment module of said supervisor module is arranged to adjust the value of said adjusted braking force signal such that the adjusted braking force value coincides with the value of the difference between the braking force application request value indicated by the braking force application request signal and the timed braking force reduction value indicated by the timed braking force reduction signal.

4. The anti-skid system according to claim 3, wherein the first time interval is monitored by a first timer means and the second time interval is monitored by a second timer means.

5. The anti-skid system according to claim 3, wherein said time-out module and said braking force application request adjustment module are implemented according to a safety level SIL≥3.

6. The anti-skid system according to claim 3, wherein said time-out module and said braking force application request adjustment module are integrated into one module.

7. The anti-skid system according to claim 2, comprising a plurality of supervisor modules;

wherein each of the supervisor modules is arranged to generate a respective adjusted braking force signal;

wherein the plurality of supervisor modules are integrated into a single module.

8. The anti-skid system according to claim 1, wherein:

the anti-skid module is arranged to generate, at said output, a braking force hold signal and a braking force reduction signal, in the presence of at least one skidding condition of at least one wheel of said at least one vehicle, in accordance with said predetermined anti-skid function;

the supervisor module is arranged to receive the braking force application request signal, the braking force hold signal and the braking force reduction signal, and to generate an adjusted braking force signal indicative of an adjusted braking force value.

9. The anti-skid system according to claim 8, wherein said supervisor module further includes a time-out module arranged to receive the braking force hold signal and the braking force reduction signal, and to generate a timed braking force hold signal and a timed braking force reduction signal;

said time-out module being arranged to:

cause the timed braking force hold signal to assume a value corresponding to the value of the braking force hold signal, when the braking force hold signal continuously assumes a first predetermined value for a time shorter than a first predetermined time interval;

cause the timed braking force hold signal to assume a first predetermined default value, when the braking force hold signal continuously assumes the first predetermined value for a time longer than the first predetermined time interval;

cause the timed braking force reduction signal to assume a value corresponding to the value of the braking force reduction signal, when the braking force reduction signal continuously assumes a second predetermined value for a time shorter than a second time interval that is shorter than said first time interval;

cause the timed braking force reduction signal to assume a second predetermined default value, when the braking force reduction signal continuously assumes the first predetermined value for a time longer than or equal to the second time interval;

wherein said braking force application request adjustment module of said supervisor module is arranged to receive the braking force application request signal, said timed braking force hold signal and said timed braking force reduction signal, and to output the adjusted braking force signal;

wherein said braking force application request adjustment module is arranged to:

when the value assumed by said timed braking force hold signal corresponds to the value of said braking force hold signal and the value assumed by the timed braking force reduction signal corresponds to the value of the braking force reduction signal, cause the adjusted braking force signal to assume a value which varies over time, such that the adjusted braking force value indicated by the adjusted braking force signal corresponds to the braking force application request value indicated by the braking force application request signal reduced over time according to a predetermined braking force reduction time curve, until the adjusted braking force signal assumes a value indicating a zero adjusted braking force value;

when the value assumed by said timed braking force hold signal corresponds to the value of the braking force hold signal and the value assumed by said timed braking force reduction signal corresponds to said second predetermined default value, cause the adjusted braking force signal to maintain over time the value assumed by said adjusted braking force signal at an instant immediately preceding the circumstance that said timed braking force hold signal has the value corresponding to the value of the brake force hold signal and the timed braking force reduction signal has said second predetermined default value;

when the value assumed by said timed braking force hold signal corresponds to said first predetermined default value and the value assumed by said timed braking force reduction signal corresponds to said second predetermined default value, cause the adjusted braking force signal to assume a value which varies over time, such that the adjusted braking force value indicated by the adjusted braking force signal increases over time according to a predetermined braking force increase curve, until the adjusted braking force value indicated by the adjusted braking force signal coincides with the braking force application request value indicated by the braking force application request signal.

* * * * *